Jan. 15, 1935. J. L. SCHUELER 1,987,642
FURNACE DRAFT INDICATOR
Filed Nov. 12, 1931
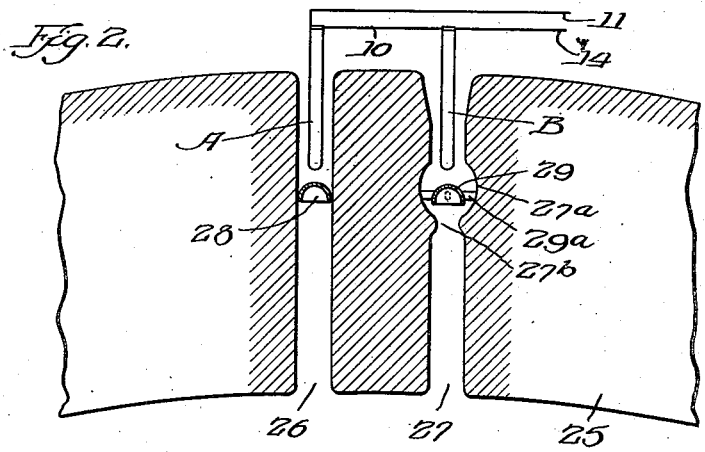
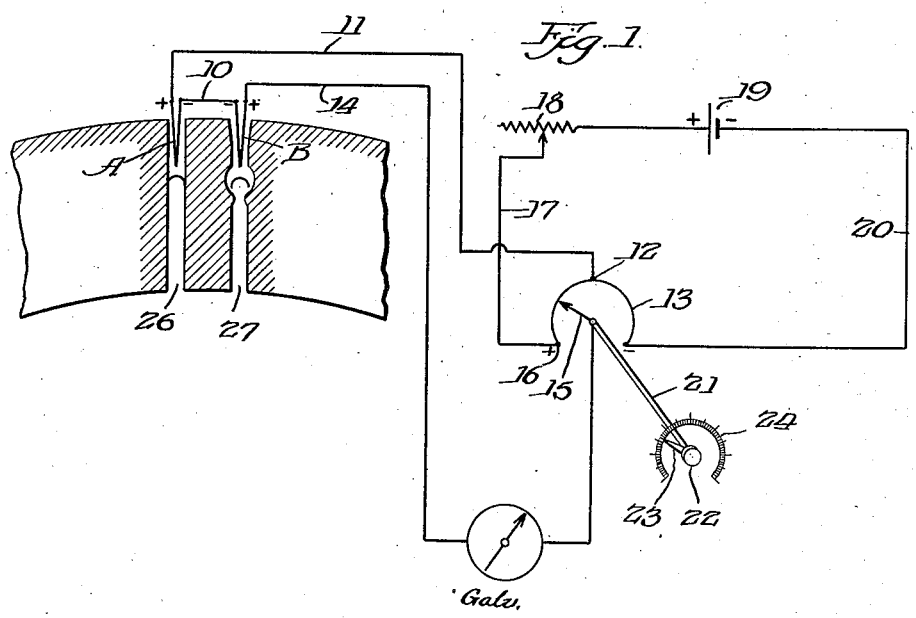
Inventor:
Julian L. Schueler
By Banning & Banning
Atty's Patented Jan. 15, 1935

1,987,642

UNITED STATES PATENT OFFICE 1,987,642

FURNACE DRAFT INDICATOR

Julian L. Schueler, Kokomo, Ind.

Application November 12, 1931, Serial No. 574,586

6 Claims. (Cl. 73—31)

It is a primary object of this invention to utilize a temperature differential caused by a change in draft either positive or negative, existing at one point in a combustion system or the like, and by temperature recording or indicating means. The possible uses to which such pressure recording means may be put are too numerous for any attempted enumeration, it being sufficient to suggest its applicability for controlling combustion conditions within a furnace, such for example, as an open hearth steel melting furnace, a furnace for a boiler setting, etc.

Another and more particular object is to provide an aid for keeping a draft in a furnace always in a balanced condition and providing means for recording or indicating whether such conditions are positive or negative with respect to said balance.

Another object is to provide means for indicating or recording the comparative heats of two points, particularly where the heats of these two points due to one cause such as radiation are varying in substantially the same amounts for both points, but where the heats at these two points may vary in different amounts due to other causes, such as differences in convection currents.

These and other objects, as will hereinafter appear, are accomplished by this invention which is fully described in the following specification and shown in the accompanying drawing, in which—

Figure 1 is a diagram of connections of thermocouple arrangement as applied to a furnace; and Fig. 2 is an enlarged detail showing a partial cross section of an arch of a furnace showing how the thermocouples are located therein.

In the embodiment illustrated two thermocouples A, B, are connected by a wire 10 which connects like poles, in this instance the negative terminals, of these thermocouples so that they are placed in opposition. These thermocouples are preferably, but not necessarily, similar so that so long as the temperatures of the junction points of these two thermocouples are maintained equal to each other the electromotive force of one will cancel that of the other, and therefore there will be no tendency from this source for current to flow in any circuit in which they are placed. Should the temperature at one of these thermocouples, however, vary with respect to the other, a difference in potential will result, and current will tend to flow in one direction or the other, depending upon which one is then at the higher temperature.

In Fig. 1 is shown a diagram of connections adapted to indicate or record the flow of such currents resulting from such an unbalanced temperature condition. The positive pole of the thermocouple A is connected by a lead 11, to a point 12 intermediate the length of a potentiometer 13, while the positive lead of the thermocouple B is connected through a lead 14 and through a galvanometer to the brush 15 of the potentiometer. The positive end 16 of the potentiometer is connected through a lead 17 and a variable resistance 18 with the positive terminal of a battery 19, while the negative terminal of this battery is connected through a lead 20 with the negative end of the potentiometer. The brush 15 is carried by a shaft 21 which has an operating knob 22 which carries a pointer 23 which moves over a graduated scale 24.

Fig. 2 shows a partial transverse section of the brick work arch 25 of a furnace, such as an open hearth furnace, a boiler setting or the like, where it is desired that the draft conditions of the furnace shall be maintained substantially unvarying. Two openings 26, 27 are provided in this arch at points preferably adjacent each other, so that the heat transmitted to these points through the brick work will be substantially equal even though the heat conditions within the furnace vary somewhat. The thermocouples A, B, are suitably mounted in the openings 26, 27, respectively, under as nearly identical conditions as possible, with the exception of the fact that the opening 26 is closed so that no gas can leave the furnace and no air can enter the same, whereas the opening 27 is arranged for the free passage of air into the furnace, or of gas therefrom.

For this purpose the opening 26 is closed by means of a cap 28 of a refractory or other suitable material, while a similar cap 29 is placed in a similar passage in the opening 27, this opening, however, being enlarged at 27$^a$ so as to permit the passage of air or gas around the cap 29. This cap is mounted therein in any suitable manner, such as by means of radiating arms 29$^a$. The opening 27 is also preferably necked in at 27$^b$, to prevent heat rays passing the cap 29.

Thus it will be seen that so long as the furnace is under a condition of draft equilibrium and no air flows into the passage 27 and no gas flows out therethrough, the heat conditions of the thermocouples A, B, will be the same or nearly so, and whatever temperature differential there is will be constant, and since they have similar characteristics and are set in opposition, there will be no tendency for current to flow either way therethrough due to the electromotive forces generated by these thermocouples. Under these conditions the closed battery circuit of Fig. 1 is set by adjusting the position of the brush 15 on the potentiometer 13, so that the galvanometer needle reads zero, indicating that no current is flowing in either direction through the leads 11, 14 which are connected to the thermocouples A, B.

As soon, however, as the pressure equilibrium of the furnace is upset in the slightest degree, and for example, air has a tendency to flow into the furnace through the opening 27, this air being cooler than the gas surrounding the thermocouple B will cause the thermocouple B to cool, thereby causing an unbalanced condition which will produce a slight flow of current through the galvanometer which will thereby be deflected in one direction from the zero point, let us say to the right. An operator watching this galvanometer will then adjust the furnace controls so as to bring the pressure conditions within the furnace back to normal. If he moves them too far, however, the opposite pressure condition within the furnace will prevail, and gas from the furnace will tend to flow out through the opening 27, with the result that the temperature of the thermocouple B will be raised above normal, as indicated by the thermocouple A, with the result that an electric current will then flow through the thermocouples and through the leads 11, 14 in the opposite direction and moving the galvanometer to the left. The operator seeing the galvanometer moving to the left will then set the controls of the furnace so as to slightly reduce the pressure within the furnace in an attempt to again bring the pressure back to the desired normal.

Inasmuch as the two thermocouples A, B are preferably similar and are set in opposition under conditions which are normally as nearly equal as may be, the question of balancing out any slightly unbalanced voltage is necessarily a delicate one, and this is accomplished as shown in Fig. 1 by providing a potentiometer with a connection 12 intermediate its length, so that the brush 15 may be moved either side of the connection 12 so as to balance out any unbalanced voltage of the thermocouples, as indicated by the galvanometer under what are assumed to be the desired normal conditions.

While the openings 26, 27 are described as in the arch of a furnace, it will be understood that they may be placed in the side wall or at any other point where the conditions warrant. It will also be understood that this arrangement of potentiometers is applicable for the indication of back and forth movement of the fluids of various kinds, particularly where the fluid on one side of the datum point is at a temperature below normal, while that on the other side is above the predetermined normal.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. In combination, a furnace having a wall with two openings therethrough, two similar thermocouples opposed in series circuit, one thermocouple being in each of said openings, one of said openings being closed between the furnace and its thermocouple, the other opening establishing communication between the outside air and the interior of the furnace so that its thermocouple is influenced by furnace draft, means for indicating current flowing either way through said circuit, and means for electrically balancing the circuit so that substantially no current flows through the circuit when the two thermocouples have a predetermined temperature differential but current will flow when the physical conditions affecting one are changed so as to change the temperature differential.

2. In combination, a furnace having a wall with two openings therethrough, two thermocouples of similar construction opposed in series circuit, one thermocouple being in each of said openings, one of said openings being closed intermediate its length by a draft preventing means located between the furnace and its thermocouple, the other opening having means for intercepting radiant heat between the furnace and the thermocouple and permitting communication between the outside air and the interior of the furnace so that its thermocouple is influenced by furnace draft, means for indicating current flowing either way through said circuit, and means for electrically balancing the circuit so that substantially no current flows through the circuit when the two thermocouples have a predetermined temperature differential but current will flow when the physical conditions affecting one are changed so as to change the temperature differential.

3. In combination, a furnace having a wall with two openings therethrough, two thermocouples of similar construction opposed in series circuit, one thermocouple being in each of said openings, one of said openings being closed intermediate its length by a solid member located between the furnace and its thermocouple, the other opening having a similar member for intercepting radiant heat between the furnace and its thermocouple and permitting communication between the outside air and the interior of the furnace so that its thermocouple is influenced by furnace draft, means for indicating current flowing either way through said circuit, and means for electrically balancing the circuit so that substantially no current flows through the circuit when the two thermocouples are under substantially the same physical conditions but current will flow when the physical conditions of one are changed so as to change its temperature relative to the other.

4. In combination, a furnace having a wall with two passages one extending through the wall to permit a draft therethrough and the other open to the outside air but closed to draft therethrough, two similar thermocouples one arranged in the closed passage removed from draft and the other arranged in the open passage to be influenced by draft therein, an electrical circuit connecting the thermocouples serially in opposition, means for indicating current flowing either way through the circuit, and means for electrically balancing the circuit so that substantially no current flows when the two thermocouples have a predetermined temperature differential but current will flow with a change in temperature conditions affecting the temperature differential.

5. In apparatus of the class described, a furnace having walls, two openings in one of said walls, one of said openings affording a passage for the egress of products of combustion from said furnace when said products are under pressure and ingress of atmospheric air when said products are under draft and neither egress of said products nor ingress of said air where said products are under balanced draft, a means in said opening to intercept radiant heat without closing the passage therethrough, a means to intercept radiant heat in the second of said openings adapted to close off entirely egress of said products and ingress of said air, temperature responsive means in both said openings, and means associated with the temperature responsive means adapted to register substantially no differential between the temperatures in said openings when said furnace is under balanced draft, but adapted to register a differential showing a higher temperature in the first opening when furnace gases flow out of the furnace through the opening, and a reverse differential showing a lower temperature when said air flows into the furnace through the opening.

6. In apparatus of the class described, a furnace having walls, two openings in one of said walls, one of said openings affording a passage for the egress of products of combustion from said furnace when said products are under pressure and ingress of atmospheric air when said products are under draft and neither egress of said products nor ingress of said air where said products are under balanced draft, a means in said opening to intercept radiant heat without closing the passage therethrough, a means to intercept radiant heat in the second of said openings adapted to close off entirely egress of said products and ingress of said air, temperature responsive means in both said openings, and means associated therewith including a hand movable over a dial adapted to register substantially no differential between the temperatures in said openings when said furnace is under balanced draft, but adapted to register a differential showing a higher temperature in the first opening when furnace gases flow out of the furnace through the opening, and a reverse differential showing a lower temperature when said air flows into the furnace through the opening.

JULIAN L. SCHUELER.